(12) United States Patent
Arslan

(10) Patent No.: US 7,733,937 B2
(45) Date of Patent: Jun. 8, 2010

(54) SYSTEM AND METHOD FOR CROSS-MODULATION INTERFERENCE REDUCTION FOR PULSE-POSITION MODULATED ULTRAWIDEBAND SIGNALS

(75) Inventor: Huseyin Arslan, Tampa, FL (US)

(73) Assignee: University of South Florida, Tampa, FL (US)

( * ) Notice: Subject to any disclaimer, the term of this patent is extended or adjusted under 35 U.S.C. 154(b) by 722 days.

(21) Appl. No.: 11/619,060

(22) Filed: Jan. 2, 2007

(65) Prior Publication Data

US 2007/0153874 A1 Jul. 5, 2007

Related U.S. Application Data

(60) Provisional application No. 60/755,868, filed on Jan. 3, 2006.

(51) Int. Cl.
  H04B 1/00 (2006.01)
(52) U.S. Cl. .................................. 375/130; 370/213
(58) Field of Classification Search ................. 375/130, 375/132, 134, 133, 135, 138, 139, 239; 370/213
  See application file for complete search history.

(56) References Cited

U.S. PATENT DOCUMENTS

| 2004/0190596 A1* | 9/2004 | Lehmann et al. ............ 375/138 |
| 2005/0105594 A1* | 5/2005 | Giannakis et al. ........... 375/132 |
| 2005/0207474 A1* | 9/2005 | Voglewede ................. 375/132 |

OTHER PUBLICATIONS

E.R. Bstidas-Puga, F. Ramierz-Mireles, and D. Munoz-Rodriguez, "Performance of UWB PPM in Residential Multipath Environments," in Proc. IEEE Vehic. Techn. Conf.-Fall, vol. 4, Orlando, FL, Jun. 2003, pp. 2307-2311.

L. Zhao and A. M. Haimovich, "Capacity of M-ary PPM Ultrawideband Communications Over AWGN Channels," In Proc. IEEE Vehic. Techn. Conf.-Fall, vol. 2, Atlantic City, NJ, Jul. 2001, pp. 1191-1195.

L. Bin, E. Gunawan, and L.C. Look, "On the BER Performance of TH-PPM UWB Using Parrs Monocycle in the AWGN Channel," inProc. IEEE Conference on Ultra Wideband Systems and Technologies, Reston, VA, 16 2003, pp. 403-407.

J.D. Choi and W.E. Stark, "Performance Anaylsis of Rake Receiver for Ultra-wideband Communications with PPM and OOK in Multipath Channels," in Proc. IEEE Int. Cont. Commun., vol. 3, New York, NY, Apr. 28-May 2002. pp. 1969-1973.

(Continued)

Primary Examiner—Mohammad H Ghayour
Assistant Examiner—Jeffrey Parker
(74) Attorney, Agent, or Firm—Molly L. Sauter; Smith & Hopen, P.A.

(57) ABSTRACT

The present invention provides a novel technique for reducing the effect of CMI for PPM UWB signals. The system and method in accordance with the present invention greatly improves the performance of receivers and eliminates the possibility of catastrophic errors. The proposed technique introduces a variable modulation index instead of a fixed modulation index as was previously known in the art. The modulation index is changed over each frame within each symbol. In other words, a time hopping modulation index sequence is used over the frames of the UWB symbols in accordance with the present invention.

8 Claims, 8 Drawing Sheets

OTHER PUBLICATIONS

J.H. Cho and Q. Zhang, "Design of Rake Receivers for Ultra-wideband Binary Block-coded PPM in Dense Multipath Channels," in Proc. IEEE Mil. Commun. Conf., vol. 2, Boston, MA, 13 2003, pp. 874-879.

M. Kamoun, M. De Courville, L. Mazet, and P. Duhamel, "Impact of desynchronization on PPM UWB systems: a capacity based approach," in Proc. IEEE Information Theory Workshop, San Antonio, TX, 24 2004, pp. 198203.

H. Celebi and H. Arslan, "Cross-Modulation Interference for Pulse Position Modulated UWB Signals," in Proc. IEEE Military Communication Conference (MILCOM), Atlantic City, NJ, Oct. 2005.

A.F. Molisch et al., "IEEE 802.15.4a channel model—final report," 2005, tech. rep. doc: IEEE 802.15-04-0662-02-004a. [Online]. Available: http://www.ieee802.org/15/pub/TG4a.html.

* cited by examiner

SYSTEM AND METHOD FOR CROSS-MODULATION INTERFERENCE REDUCTION FOR PULSE-POSITION MODULATED ULTRAWIDEBAND SIGNALS

CROSS REFERENCE TO RELATED APPLICATIONS

This invention claims priority to U.S. Provisional Patent Application No. 60/755,868, filed Jan. 3, 2006, and titled "Method and Apparatus for Cross-Modulation Interference Reduction for Pulse-Position Modulated Ultrawideband Signals".

BACKGROUND OF THE INVENTION

Ultrawideband (UWB) is a recent technology that brings attractive solutions for future wireless broadband applications. Impulse Radio (IR) is a popular implementation of UWB systems; although conceptually not very new, UWB-IR is recently becoming popular for wireless communications. It is realized by the transmission of extremely short duration (usually sub-nanosecond) pulses.

A major challenge when designing UWB systems is the selection of the appropriate data mapping format. Depending on the parameters such as design specifications and constraints, range, transmission and reception power, quality of service requirements, regulatory requirements, and hardware complexity, there may be different modulation options that will satisfy the system designer under different scenarios. One of the popular modulation options is pulse position modulation (PPM), where the position of the transmitted pulse is varied depending on the information bits. One of the attractive features of the PPM modulation in UWB is that it allows the use of non-coherent detection at the receiver, avoiding the complex and difficult channel estimation process.

In wireless communications, the transmitted UWB signals that propagate through a radio channel are typically reflected, diffracted, and scattered, arriving at the receiver through multiple paths. In UWB, the resolvable multipath components are much larger, typically on the order of a hundred. The multipath propagation causes cross-modulation interference (CMI) for PPM modulated signals if the time difference between two possible hopping positions (i.e. modulation index) is less than the maximum excess delay of the channel. CMI degrades the performance of the UWB receiver.

CMI has been studied extensively for various UWB receiver architectures, and it has been shown that CMI has a major impact in the receiver performance. It is suggested strongly that solutions to avoid/suppress CMI are needed to improve the performance of PPM modulated UWB signals. The effect of CMI on average BER performance of UWB receivers has been studied and it has been demonstrated that CMI significantly degrades the average BER performance of receivers. More significantly, CMI causes catastrophic errors when a strong multipath component occurs at the opposite symbol location. Therefore, average BER performance degradation does not tell the whole story. There are cases where the CMI interference can hurt the receiver so badly that it eventually causes a sequence of symbol errors and hence shuts down the communication link completely.

Increasing the transmitter power may not even help in these cases. This motivates the need for techniques to suppress CMI.

Accordingly, what is needed in the art is a system and method for an improved cross-modulation interference (CMI) reduction technique for pulse-position modulated UWB signals.

SUMMARY OF INVENTION

The present invention provides a novel technique for reducing the effect of CMI for PPM UWB signals. The proposed approach improves the performance of receivers greatly and eliminates the possibility of catastrophic errors. The proposed technique introduces a variable modulation index instead of a fixed modulation index as is currently known in the art. In accordance with the present invention, the modulation index is changed over each frame within each symbol. In other words, a time hopping modulation index sequence is used over the frames of the UWB symbols in accordance with the present invention.

In a particular embodiment of the present invention, a method for reducing the effect of cross-modulation interference (CMI) in a pulse-position modulatated (PPM) ultrawideband (UWB) multipath channel is provided, including the steps of identifying a variable modulation index for the multipath channel, communicating the variable modulation index to a receiver and transmitting a symbol employing the variable modulation index to the receiver.

In accordance with the present invention, the transmitted symbol includes a plurality of pulses and each of the plurality of pulses occupies a location in a frame.

The variable modulation index is used to vary the modulation index across the plurality of frames of the symbol.

The pulse-position modulation in accordance with the present invention may be a binary pulse-position modulation system or a Mary-pulse-position modulation system.

In an embodiment of the present invention, a transceiver is provided for reducing the effect of cross-modulation interference (CMI) in a pulse-position modulatated (PPM) ultrawideband (UWB) multipath channel. The transceiver in accordance with the present invention includes circuitry for identifying a variable modulation index for the multipath channel and for communicating the variable modulation index to the receiver and a transmitter for transmitting a symbol employing the variable modulation index to the receiver.

As such, the present invention provides a system and method for an improved cross-modulation interference (CMI) reduction technique for pulse-position modulated UWB signals. The index hopping method in accordance with the present invention greatly improves the average BER performance of the UWB receivers.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Depending on the type of multiple accessing and other system parameters, various system models can be used for UWB. In a particular embodiment of the present invention, time hopping (TH) impulse radio (IR) based UWB is considered.

Figure 1:
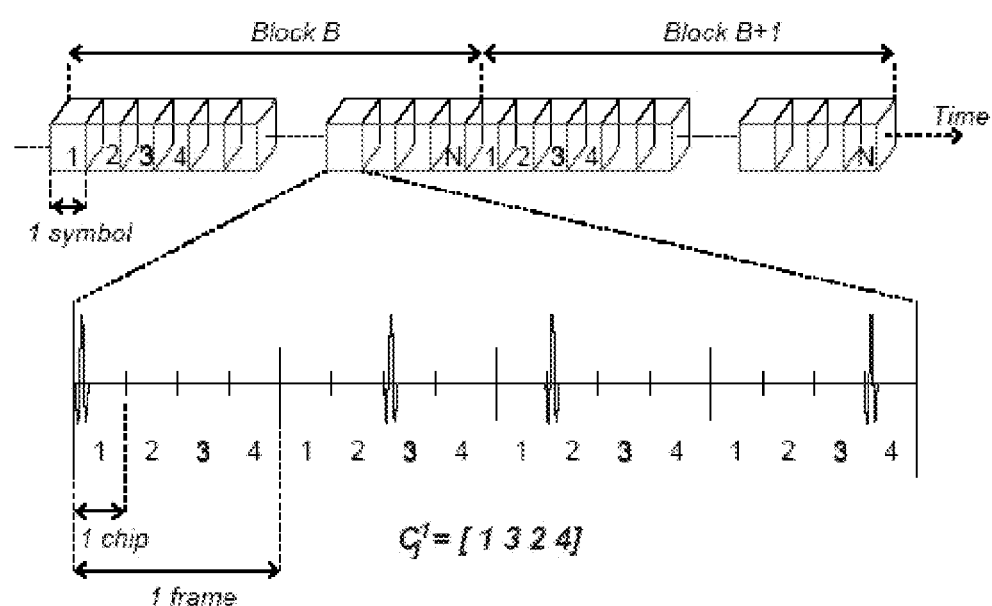
FIG. 1 illustrates a simple TH-IR-UWB signal structure: Each symbol carrying the information is transmitted with a number of pulses, where in this FIG. 4 pulses represent a symbol. Pulses occupy a location in the frame based on the specific pseudo random (PN) code assigned for each user. A block in this figure represents a number of symbols where FEC coding interleaving, and other MAC layer protocols might be applied.

A simple TH multi-access model of the UWB communication system as known in the prior art is shown with reference to FIG. 1. As illustrated in FIG. 1, each symbol carrying the information is transmitted with a number of pulses, wherein in this figure, four pulses represent a symbol. Pulses occupy a location in the frame based on the specific pseudo random (PN) code assigned for each user. A block in this figure represents a number of symbols where FEC coding, interleaving and other MAC layer protocols might be applied.

The pulsed UWB approach often transmits many low duty cycle pulses to represent a bit, where the number of pulses in a symbol is a design criterion which determines the processing gain of the system. The off-time between two consecutive pulses implies a second type of processing gain which helps against multipath and multi-user interference, allowing other users to transmit in the gaps between these pulses.

In a particular embodiment, a single user time hopped system with binary pulse position modulation (PPM) is considered. The TH-PPM signal at the transmitter can be represented as, $$s_{tr}(t) = \sum_{i=-\infty}^{\infty} w_{tr}(t - iT_f - T_i - b_{[i/N_S]}\delta) \quad (1)$$

where $\delta$ is the modulation index, b is the random bit value, $T_f$ is the pulse repetition time, $w_{rx}(t)$ is the transmitted pulse, $T_i$ is the time hopping PN sequence. In a typical time hopping UWB system, each data symbol is transmitted over multiple monopulses. In the above equation, $N_S$ denotes the number of pulses that correspond to one information bit. The transmitted signal after passing through the multipath channel is received at the receiver antenna, along with the noise. The composite signal at the receiver can be represented as, $$r(t) = \sum_{i=-\infty}^{\infty} \sum_{k=1}^{K-1} \{\beta_k w_{rx}(t - iT_f - T_i - b_{[i/N_S]}\delta - \tau_k)\} + n(t), \quad (2)$$

where K is the number of channel taps, $\beta_k$ and $\tau_k$ are the amplitude and the delays of each path, $w_{rx}(t)$ is the received pulse, and n(t) is the white Gaussian noise with zero mean and variance of $\sigma_0^2$. It is assumed that all multipaths have the same effect on the transmitted pulse shape.

Figure 2:
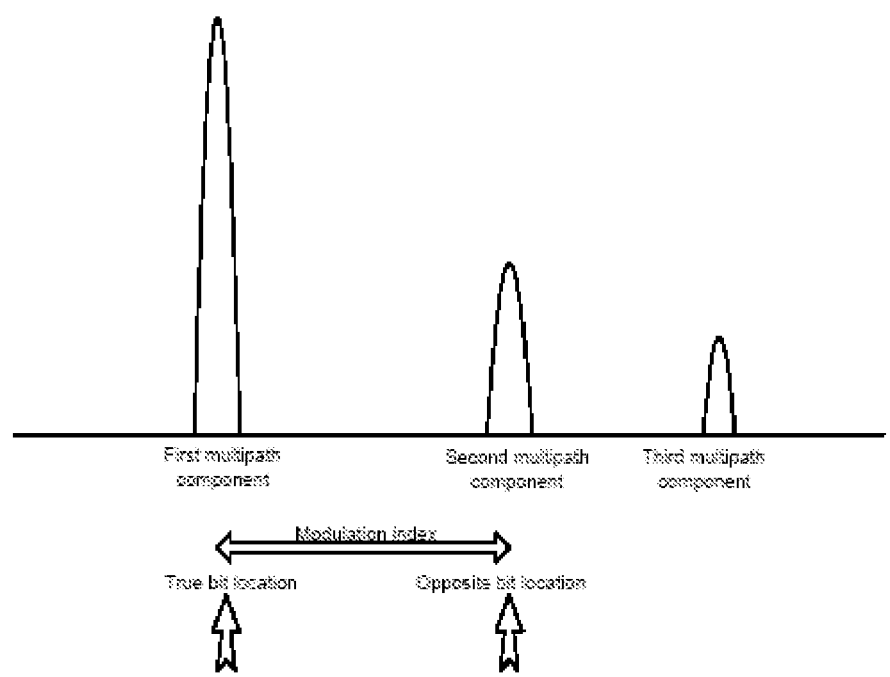
FIG. 2 is an exemplary illustration of the CMI problem in accordance with the present invention.

According to a binary PPM modulation, the bits are transmitted at two possible positions separated by the amount of the modulation coefficient. At the receiver, the decision about the transmitted bits is made by comparing the energy at each position. When there is only a single path (i.e. flat fading channel) at the true bit position, the transmitted pulse along with the background noise will appear, and at the opposite bit position only noise will appear. However, in a multipath channel, when the modulation index is less than the maximum excess delay of the channel, a multipath component is likely to appear at the opposite bit location. Therefore, the undesired energy due to the multipath component will affect the bit decision depending on the relative path energy at the desired and the opposite bit locations. This problem is referred as Cross-Modulation interference (CMI). FIG. 2 illustrates the CMI problem where three multipath components are shown for simplicity; all the multipath components correspond to the transmission of the pulse that reflects the same bit value. Notice that the second multipath component falls in the position of the opposite bit value. Therefore, even though the opposite bit is not transmitted (in this position), due to this multipath component, an interference effect will occur. Note that when $\delta$ is greater than the pulse duration, the PPM modulation is an orthogonal modulation without multipath. The multipath basically distorts this orthogonality.

In a particular embodiment, a simple single correlator receiver is employed where the correlator is tuned to one of these multipath components, which is usually the strongest path. Assuming that the strongest path is the kth path, the correlator output for both bit position hypotheses can be written as, $$H_{true} = \beta_k \phi + z_1$$

$$H_{false} = I + z_2 \quad (3)$$

where $\phi$ is the correlation of the received pulse with the local template, $z_1$ and $z_2$ are the noise terms at the output of both correlators, and I is the CMI term due to the possible other multipath that falls in the position of the opposite bit. The CMI term will include the amplitude of the interfering path, which in this case is taken to be the jth path, and also the correlation of the local template with the pulse in the jth path location. Since the pulse in the jth path might not be perfectly aligned with the local template, this correlation can be represented as, $\phi_\rho$, where $\rho$ represents the mis-alignment factor and it can not be greater than one ($\rho > 1$). As the interfering path moves away from the opposite bit position, then $\rho$ goes to zero. In the limiting case, if the interfering path is exactly at the opposite bit location, then $\rho=1$. As a result, the CMI term can be represented as, $$I = \beta_k \phi \rho \quad (4)$$

Note that if the received signal is synchronized to the strongest path, then $\beta_k \geq \beta_j$. In a particular embodiment utilizing a rake receiver, where multiple correlators are used for several multipath components, the problem of CMI will be even more pronounced, as the condition of $\beta_k \geq \beta_j$ is not guaranteed for all desired and interfering pairs of the multipath components.

Similarly, in a TR scheme and other non-coherent transceivers, the CMI will affect the performance of the detector performance. The details of the effect of CMI on TR receivers and energy detectors can be found in the prior art.

In accordance with an embodiment of the present invention, the modulation index in a transceiver is hopped in time over multiple frames of the UWB symbol. Note that the hopping sequence of the modulation index is known by the receiver. The advantage of hopping is two-fold: catastrophic errors are avoided and the average BER performance is improved. The first advantage is especially important for low mobility applications. It ensures that the receiver is not hit by a strong CMI term continuously. The second advantage of the present invention results from the effect of averaging the interference over multiple frames.

Figure 3:
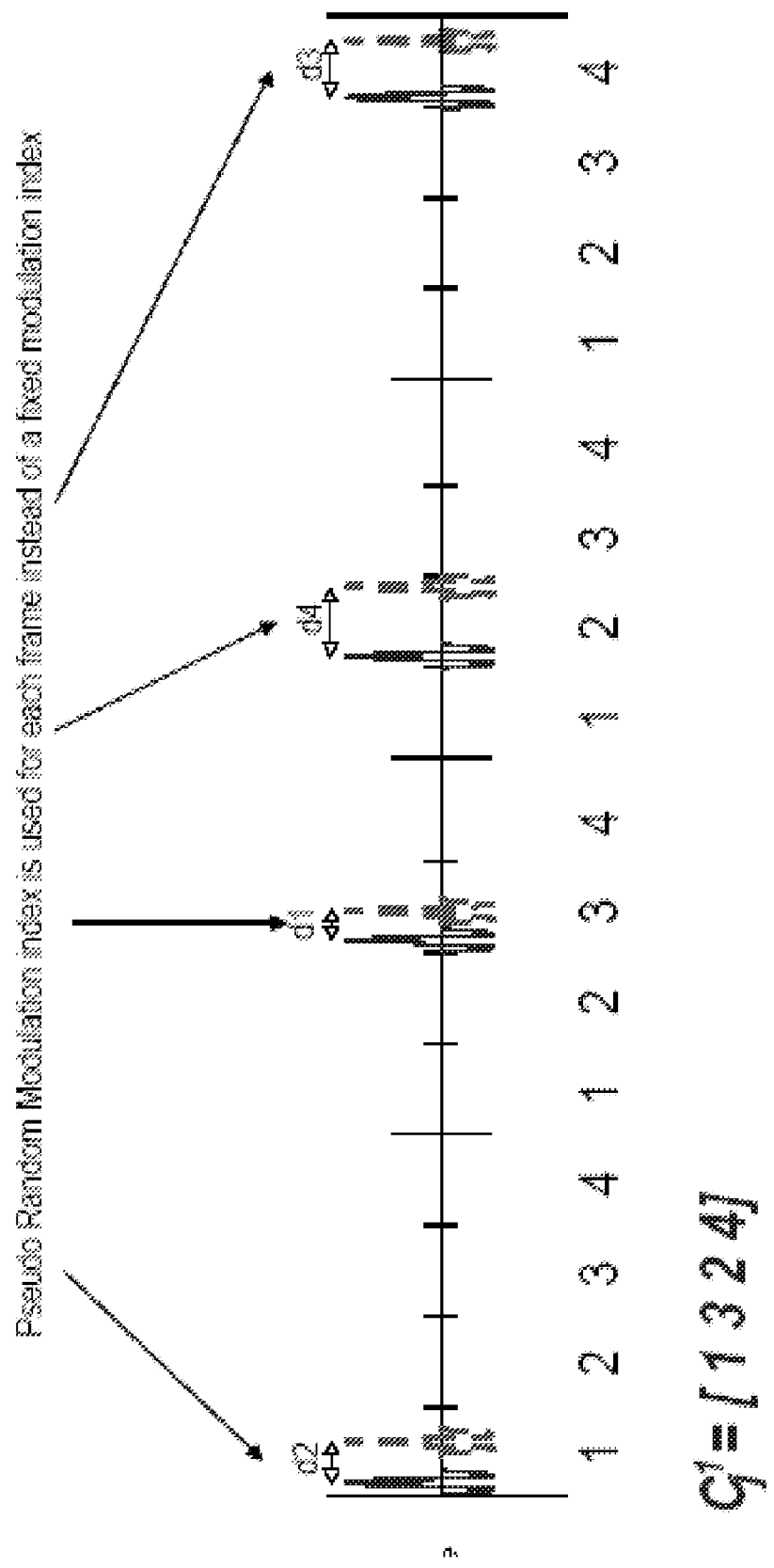
FIG. 3 is an exemplary illustration of the proposed variable modulation index in accordance with an embodiment of the present invention.

FIG. 3 shows a representative example of the variable modulation indexing in PPM in accordance with the present invention. The dashed lines show the position of the opposite bit with respect to the actual transmitted bit. Note that the position changes in each frame compared to the conventional fixed indexing. Designators d1-d4 represent the exemplary variable modulation indexes. In a conventional PPM, the modulation index $\delta$ is constant over all the frames. Therefore, if CMI is experienced, if affects all of the frames within a symbol. Note that improving processing gain by increasing the number of frames within a symbol does not help to increase signal-to-interference-ratio (SIR). Because, the CMI will exist in all the frames equally. In the present invention, the SIR is referred to as the ratio of the desired tap to the interfering tap due to CMI. Similarly, as mentioned before, increasing the transmitted power will also increase the self-interference proportionally; as such the SIR will remain the same.

In accordance with an embodiment of the present invention, when the modulation index is changed through the different frames, by utilizing a pseudo random index value, within a symbol, the effect of multipath on the opposite bit position is averaged. Even though this will improve the average SIR, the more significant benefit is in the avoidance of the catastrophic errors. In addition, the processing gain due to the increase in the number of pulses or frames per symbol, will also be exploited in improving the SIR, where as the processing gain is increased, the SIR will also improve, proportionally.

Figure 4:
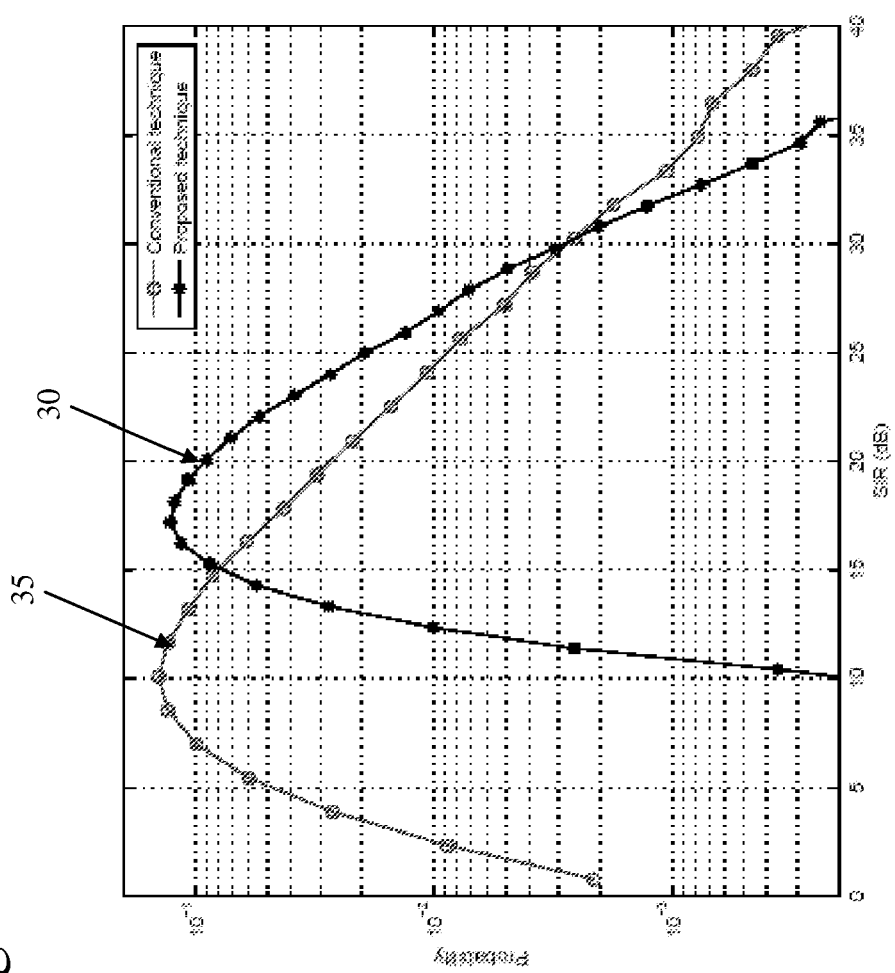
FIG. 4 is an exemplary illustration of the SIR distribution for both the conventional scheme currently known in the prior art and the proposed PPM modulation scheme in accordance with an embodiment of the present invention having a pulse duration of 0.1 ns.
Figure 5:
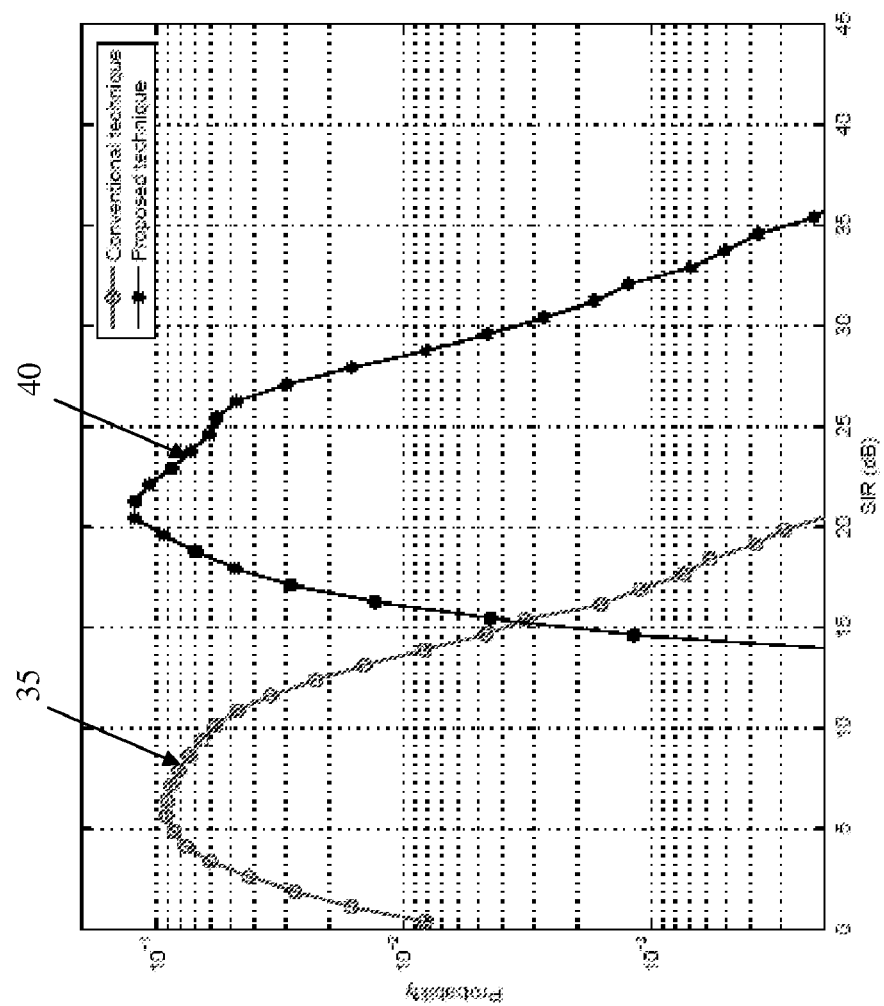
FIG. 5 is an exemplary illustration of the SIR distribution for both the conventional scheme currently known in the prior art and the proposed PPM modulation scheme in accordance with an embodiment of the present invention having a pulse duration of 0.8 ns. The average SIR values are 12 dB and 18.7 dB respectively.
Figure 6:
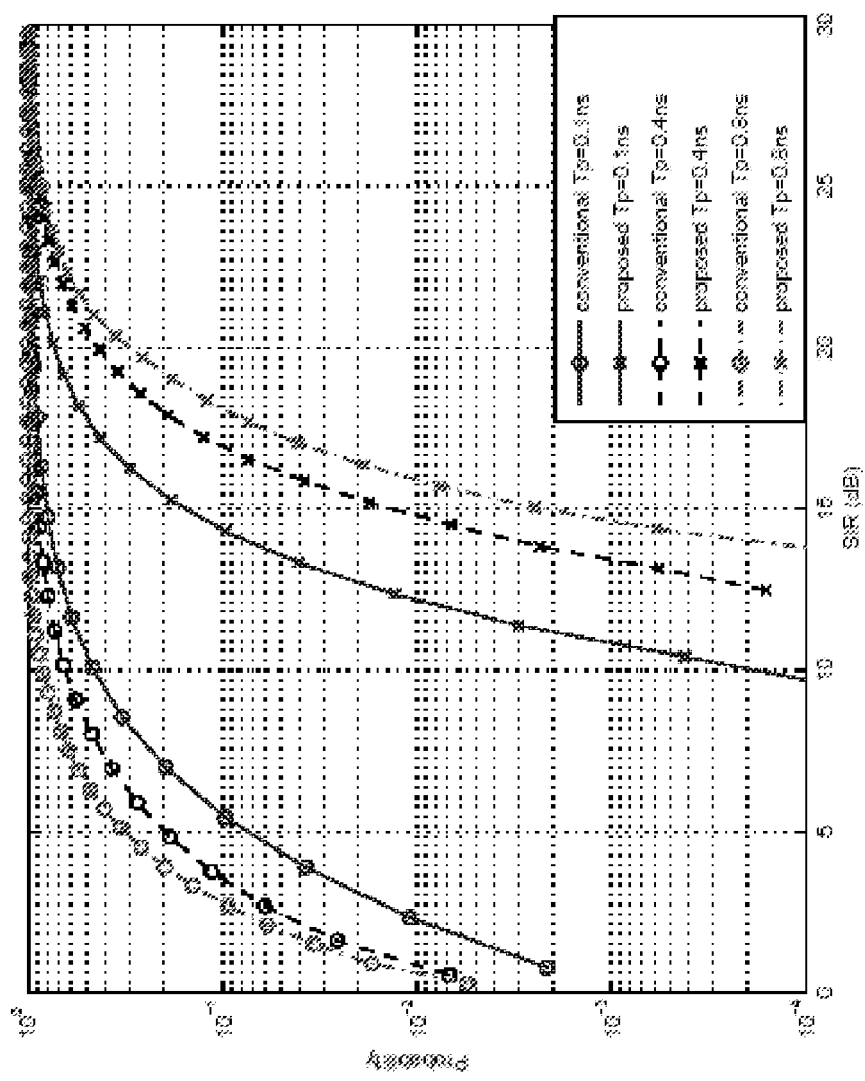
FIG. 6 is an exemplary illustration of the cumulative density of the SIR for both the conventional scheme currently known in the prior art and the proposed PPM modulation scheme in accordance with an embodiment of the present invention with various pulse durations. The average SIR values are 22 dB and 7 dB respectively.
Figure 7:
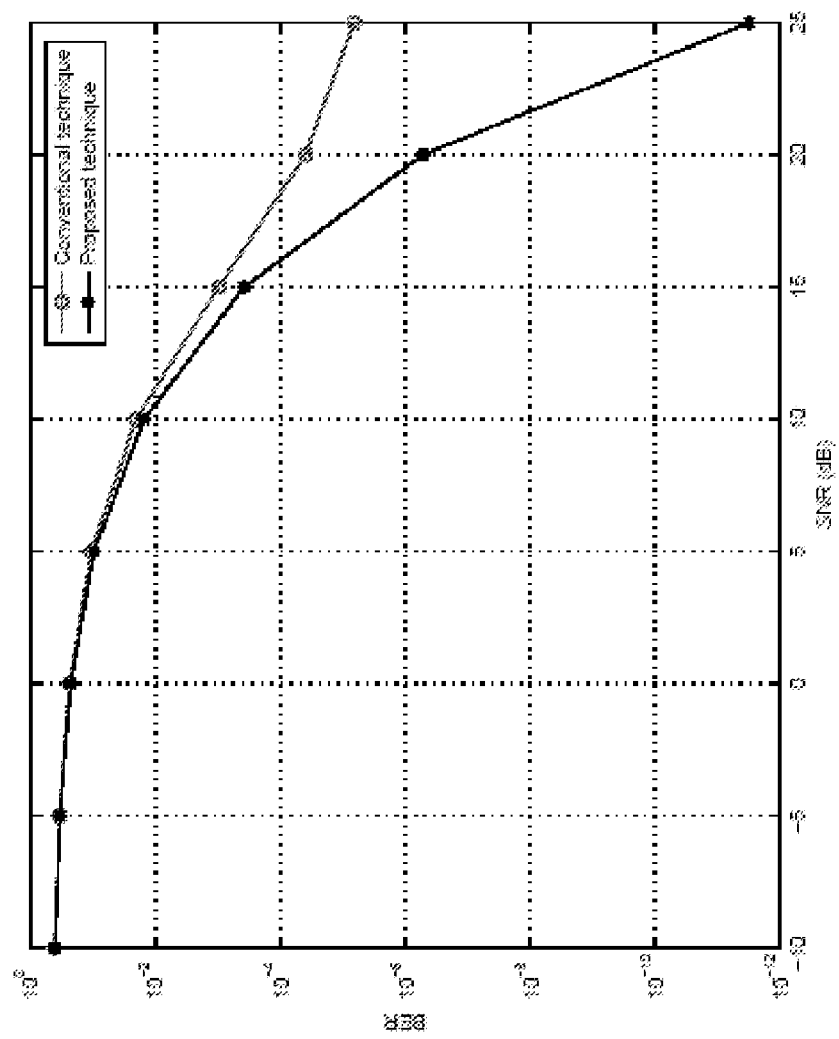
FIG. 7 is an exemplary illustration of a comparison of the bit-error-rate (BER) performances of the conventional scheme currently known in the art and the proposed scheme in accordance with an embodiment of the present invention having a pulse duration of 0.1 ns.
Figure 8:
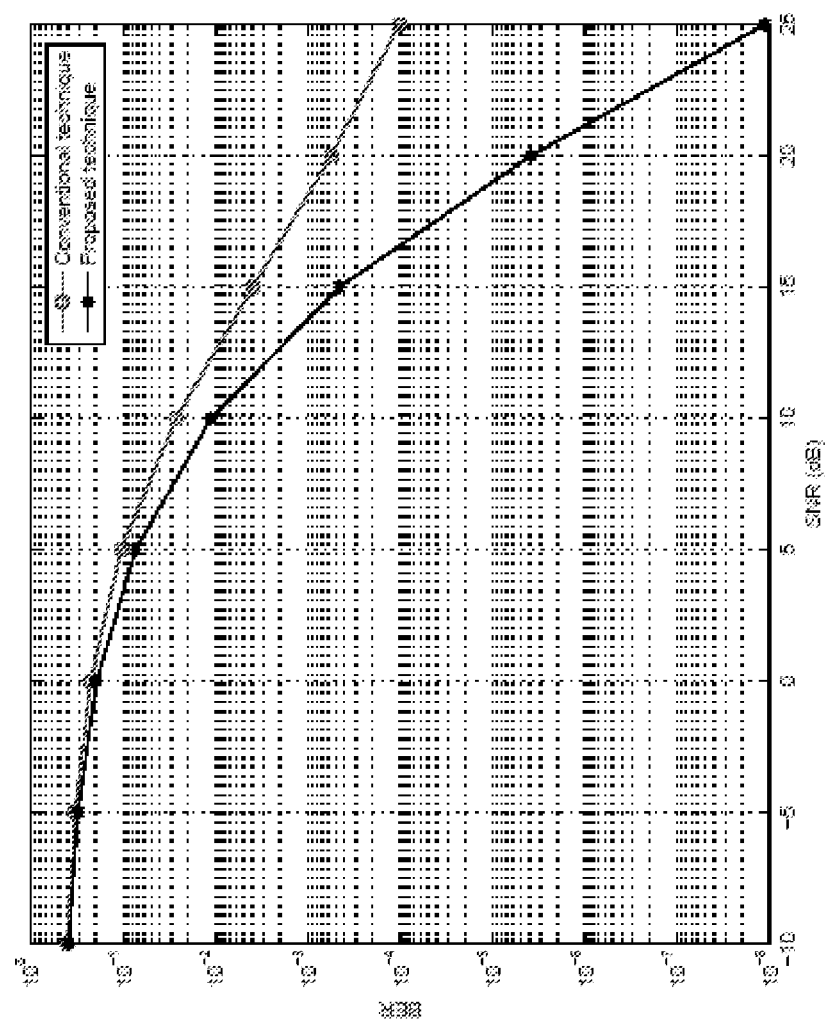
FIG. 8 is an exemplary illustration of a comparison of the bit-error-rate (BER) performances of the conventional scheme currently known in the art and the proposed scheme in accordance with an embodiment of the present invention with pulse duration of 0.8 ns.

FIG. 4 through FIG. 8 illustrate the simulation performance of the system and method in accordance with the present invention in comparison to the conventional PPM transmission scheme currently known in the art under practical channel considerations for 50 frames per symbol. In a particular embodiment, there are 50 different modulation indexes. In all the illustrated figures, a single rake reception is considered having a one tap correlator. The performance gains in multi-tap selective rake and all-rake receptions will be even more pronounced. In FIG. 4 through FIG. 6, the SIR distributions for the conventional and proposed scheme, in accordance with the present invention, are obtained in a standard CMI channel model for various pulse width values. As illustrated, the method in accordance with the present invention improves the effective SIR greatly. The average SIR values for the conventional and proposed schemes in 3 different pulse widths are calculated as; 12 dB and 18.7 dB for a pulse width of 0.1 ns; 9.5 dB and 21 dB for a pulse width of 0.4 ns; and 7 dB and 21 dB for pulse width of 0.8 ns, respectively. As illustrated, the SIR improvement is more with wider pulse durations, as is discussed below. The improvement in SIR will, therefore, affect the BER performance. FIG. 7 and FIG. 8 illustrate the BER performance comparison of the proposed and conventional PPM transceiver. As illustrated, the proposed scheme does not have an error floor that is caused by catastrophic errors. Additionally, the method in accordance with the present invention improves the average BER performance.

In a particular embodiment, an assumption is made that the channel taps are independent and Gaussian distributed with zero means and with variance of $\sigma_1^2$, when the CMI occurs, the self interference will be the same over all the frames. Therefore, processing over multiple frames will not average the self-interference. At the end, the SIR will be the same, whether or not a single frame or multiple frames are used. The present invention assumes the interference is only due to CMI, when there are other interferences, the situation is different. On the other hand, when the modulation index is varied across the frames, as in accordance with the method of the present invention, then, the self-interference term is averaged over multiple taps that hit the opposite bit position.

In a specific embodiment, the assumption is made that N independent multipath components hit the opposite bit position across different frames. To get N independent hits, there need to be at least N frames within a symbol. In practice, the number of frames should be much larger than N. When the interference is averaged across multiple frames, the resulting interference power will be $N\sigma_1^2$ in the method in accordance with the present invention, in contrast to the $N^2\sigma_1^2$ as in the case of the conventional PPM modulation known in the art. As a result, the proposed scheme will have a 10 log(N) dB better average SIR compared to the prior art scheme. As can be seen, the SIR increases as the number of frames increases, and hence, the number of averaging across multiple hits increases. The scenario presented is meant to be exemplary. In the simulation results given above, the maximum achievable gain is represented. The maximum achievable gain is not always achievable. For example, in the simulation results provided, a 17 dB average SIR gain should have been observed with the present invention. As can be seen in the figures, the gains were less than expected. In reality, the gains will be less compared to this maximum achievable gain. First of all, the above analysis assumes that the multipath will always hit the opposite bit duration. In reality, this depends on the multipath profile and the pulse width. If the multipath profiles is very dense and the pulse width is large, it is highly possible to get a hit in the opposite duration bit. However, if the profile is sparse, or for narrower pulse durations, the probability of the hit must be factored into the analysis. Secondly, the figures presented assumed that the multipath components have equal power, which is reality will not be the case. A realistic multipath power delay profiles need to be included for a more accurate analysis.

The modulation index hopping method in accordance with the present invention additionally provides a smoother power spectrum through reduction of the undesired spectral lines, and improved PHY level security through the hopping of the modulation index. The index hopping make the detection of the received signal difficult for a receiver that does not know the hopping sequence.

Additionally, while the discussion and illustration have focused on the present invention for a binary PPM, the concept can be extended to Mary-PPM, and similar gains can be obtained for the higher order PPM cases as well. Also, the present invention can be applied to non-coherent transmit reference type transceivers.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method for reducing the effect of cross-modulation interference (CMI) within a transmitted symbol in a pulse-position modulated (PPM) ultra-wideband (UWB) multipath channel, wherein a plurality of pulses are used to represent the transmitted symbol occupying a plurality of frames and each of the plurality of pulses are transmitted at each of two possible positions within a frame of the plurality of frames, the method comprising the steps of:

identifying a variable modulation index for the multipath channel, wherein the variable modulation index determines the amount of separation between the two possible positions for each of the plurality of transmitted pulses within a frame and the variable modulation index is different for each of the plurality of frames;

communicating the variable modulation index to a receiver;

transmitting a symbol employing the variable modulation index to the receiver.

2. The method of claim 1, wherein the pulse-position modulation is a binary pulse-position modulation.

3. The method of claim 1, wherein the pulse-position modulation is a Mary-pulse-position modulation.

4. A transceiver for reducing the effect of cross-modulation interference (CMI) within a transmitted symbol in a pulse-position modulated (PPM) ultra-wideband (UWB) multipath channel, wherein a plurality of pulses are used to represent the transmitted symbol occupying a plurality of frames and each of the plurality of pulses are transmitted at each of two possible positions within a frame of the plurality of frames, the transceiver comprising:

circuitry for identifying a variable modulation index for the multipath channel and for communicating the variable modulation index to the receiver, wherein the variable modulation index determines the amount of separation between the two possible positions for each of the plurality of transmitted pulses within a frame and the variable modulation index is different for each of the plurality of frames; and a transmitter for transmitting a symbol employing the variable modulation index to the receiver.

5. The system of claim 4, wherein the pulse-position modulation is a binary pulse-position modulation.

6. The system of claim 4, wherein the pulse-position modulation is a Mary-pulse-position modulation.

7. The system of claim 4, wherein the receiver is a single rake receiver.

8. The system of claim 4, wherein the receiver is a multi-tap selective rake receiver.

* * * * *